United States Patent [19]
Wolf

[11] Patent Number: 5,392,314
[45] Date of Patent: Feb. 21, 1995

[54] PROCESS FOR DETERMINING THE QUALITY PARAMETERS OF TRANSMISSION LINK FOR DIGITAL DATA STREAMS HAVING A CELLULAR STRUCTURE

[75] Inventor: Andreas Wolf, Berlin, Germany

[73] Assignee: Siemens Aktiengesellschaft, Munich, Germany

[21] Appl. No.: 941,090

[22] PCT Filed: Apr. 18, 1991

[86] PCT No.: PCT/DE91/00323

§ 371 Date: Dec. 21, 1992

§ 102(e) Date: Dec. 21, 1992

[30] Foreign Application Priority Data

Apr. 19, 1990 [DE] Germany .............................. 4012850
May 3, 1990 [DE] Germany .............................. 4014766

[51] Int. Cl.⁶ .............................................. H04B 3/46
[52] U.S. Cl. ........................................ 375/10; 375/96; 371/20.4; 371/27
[58] Field of Search ................. 375/10, 96; 324/76.33; 364/728.03, 728.07; 370/13, 17; 371/20.4, 27

[56] References Cited

U.S. PATENT DOCUMENTS

| | | | |
|---|---|---|---|
| 3,689,884 | 9/1972 | Tew, Jr. .................................. | 375/10 |
| 3,866,217 | 2/1975 | Bennett, Jr. ........................ | 371/20.4 |
| 3,965,294 | 6/1976 | Renz et al. ............................ | 375/10 |
| 4,441,192 | 4/1984 | Kita et al. ............................. | 375/14 |
| 4,486,877 | 12/1984 | Turner .................................. | 370/15 |
| 4,736,402 | 4/1988 | Landis .................................. | 375/10 |
| 4,829,519 | 5/1989 | Scotton et al. ...................... | 455/67.3 |
| 5,012,491 | 4/1991 | Iwasaki ................................. | 375/96 |
| 5,054,035 | 10/1991 | Tarallo et al. ....................... | 375/10 |
| 5,067,114 | 11/1991 | Rorden .................................. | 375/96 |
| 5,163,057 | 11/1992 | Grupp ................................ | 371/20.4 |

*Primary Examiner*—Stephen Chin
*Assistant Examiner*—Timothy J. May
*Attorney, Agent, or Firm*—Kenyon & Kenyon

[57] ABSTRACT

A process for determining quality parameters of a transmission link for digital data streams. The digital data streams have a cellular structure, each cell having a useful field able to be freely occupied with data. In the process, a sequence of test cells is provided as a test signal. The useful fields of the test cells are partially occupied, in each case, with a test pattern. The test pattern consists of a number of binary-coded data wherein the auto-correlation function of the test pattern roughly corresponds to a Dirac pulse. The position of the test pattern within the useful fields of the test cells is shifted within the series of test cells such that the position of the test pattern within the useful field is not repeated in the sequence. The series of test cells is then transmitted though the transmission link. After being transmitted through the transmission link, each cell of the data stream is correlated with a reference pattern. The reference pattern is either identical to the test pattern or to the inverse of the test pattern. Lastly, the maximum of the obtained cross-correlation function is evaluated with respect to its position relative to the start of the particular cell and with respect to its height. In each of the test cells, additional test pattern(s) may be provided in a section of the useful field separate from the section of the useful field containing the original test pattern.

11 Claims, 6 Drawing Sheets

PROCESS FOR DETERMINING THE QUALITY PARAMETERS OF TRANSMISSION LINK FOR DIGITAL DATA STREAMS HAVING A CELLULAR STRUCTURE

BACKGROUND OF THE INVENTION

The present invention relates to a process for determining quality parameters of a transmission link for digital data streams having a cellular structure, in which each cell has a useful field. This useful field can be freely occupied with data such as, a test signal to be transmitted on the transmission link and to be evaluated upon receipt.

Besides physical transmission lines, transmission links for digital data streams include other components, such as switching equipment, standardized terminals, terminal adapters, as well as terminal equipment (for example, telephones or fax units). In digital communication systems, digital data streams are transmitted at a high speed in an organized form over the transmission links. To evaluate a digital communication system, knowing quality parameters of this type of transmission link is important. Quality criteria, may include, for example, whether portions of the data stream have been lost on the transmission link, what transit time the data has required on the transmission link, whether the sequence of the data was retained, and whether single binary-coded data (bits) were transmitted incorrectly. From communications technology, testing transmission links by injecting a test signal on the input side and by evaluating the test signal after it has been transmitted through the transmission link is known.

To accomplish this, U.S. Pat. No. 4,441,192 discloses a process in which a test signal having a pronounced, peak autocorrelation function is applied to a transmission link on the input side. A compensation circuit is arranged on the output side, downstream from the transmission link to be analyzed. After being appropriately adjusted, this compensation circuit is used to compensate distortions of or disturbances in data signals to be transmitted. Those distortions or disturbances result from transmission characteristics peculiar to the transmission links. In the known process, to adjust the compensation circuit; the impulse response of the transmission link to be analyzed is determined from the cross-correlation of the test signal and the output signal. In this manner, the downstream compensation circuit can be optimally adjusted, even given transmission links having unknown or time-variant transmission characteristics, so that a substantially undistorted data signal is received on the output side.

In principle, the test signal can preferably be let-in in empty areas of a digital data stream to be transmitted under field conditions. However, one must be able to reliably recognize the measuring signal that has been let into the digital data stream.

The test signal can preferably be placed in empty areas of a digital data stream to be transmitted under field conditions. However, the ability to reliably recognize the test signal that has been placed into the digital data stream necessary.

The present invention seeks to provide a process for generating and evaluating a test signal for determining the aforementioned quality criteria and which is reliably recognizable as a test signal.

SUMMARY OF THE INVENTION

The present invention meets the aforementioned goal by providing a process including steps of:
using a sequence of test cells as a test signal, the useful fields of the test cells being occupied, in each case, with a test pattern consisting of a number of binary-coded data (bits), wherein the auto-correlation function of the test pattern roughly corresponds to a Dirac pulse and wherein, within the sequence of test cells, the position of the test pattern in the useful fields of the test cells is varied without repetition;
transmitting the sequence of test cells through the transmission link;
after being transmitted through the transmission link, correlating each cell of the data stream with a reference pattern identical to the test pattern or the inverse of the test pattern; and
evaluating the maximum of the obtained cross-correlation function with respect to its position in relation to the start of the particular cell and with respect to its height.

A Dirac pulse is understood to be a theoretical pulse with an infinitely high amplitude and an infinitely small duration having a surface area 1 (compare, for example, Otto Mildenberger, *Grundlagen der Systemtheorie fur Nachrichtentechniker* Fundamentals of System Theory for Communication Engineers, Hansa Publishers, 1981, pp. 48–50). One advantage of the process according to the present invention is that a test cell can be recognized in a digital data stream under field conditions, without needing to transport additional data along with it in the data stream to indicate that the data is a test cell. In this manner, depending on the structure of the cells, in the best case, the entire cell can be tested, because no reserved cell locations are required for such data which characterize the test pattern. Furthermore, bit errors can be established during transmission by evaluating the maximum of the obtained cross-correlation function with respect to its height. In a relatively wide range, there exists, an inversely proportional linear correlation between the height of the maximum and the number of bit errors (i.e., when the height of the maximum is less than an expected threshold value, bit errors exist and the lower the height of the maximum, the more bit errors exist). Therefore, depending on the threshold value for the height of the maximum, test patterns can also be recognized, which have one or more bit errors. However, the danger also increases (provided that the digital data stream also has cells transmitted under service conditions) that a cell transmitted correctly under service conditions contains a data pattern in its useful field, which corresponds to the test pattern or to the test pattern corrupted by bit errors. However, as the length of the test pattern increases, this danger can be considerably minimized. In addition, evaluating the position of the maximum in relation to the start of the evaluated cell permits the number of the test cell to be determined without requiring data for the number of the test cell. Otherwise, such test-cell number data would have to be additionally transmitted, and therefore would not be able to be tested and would reduce the useful field. The location of test pattern within the test cell is shifted in each test cell of the sequence with respect to the start of the test cell which enables systematic errors to be additionally recognized in an advantageous manner. When all variations of the test pattern in the useful fields of the test cells, taken together, cover the entire useful field of the test cell, each location in the useful field is occupied at least once with a binary-coded data of the test pattern.

If a particularly large number of test cells is to be used, then, according to the present invention, the test signal is supplemented by other test cells, whose useful fields are partially occupied, in each case, with a test pattern that is the inverse of the test pattern of the original test cell. In this manner, the number of test cells that can be recognized without additional data is doubled. If a still further increase in the number of test cells is desired, then an additional sequential number, which is input in binary form in the useful field, is applied. This sequential number should preferably have an exponential form. This means that after reaching a certain number (for example 100) of test cells, whose number can be recognized through the cross-correlation, the exponent is set and the varying of the test cells starts from the beginning again. Thus, in the example, the number of test cells is increased to 200.

To carry out the process according to the present invention with a measuring signal having a very large number of different test cells, a further development of the process according to the present invention includes steps of:

in addition to the test pattern provided in each test cell in one section of their useful fields, providing in a second section of their useful fields, a second test pattern consisting of a number of binary-coded data (bits), wherein the autocorrelation of the second test pattern corresponds roughly to a Dirac pulse;

varying the position of the second test pattern in the second section of the useful fields of the test cells within the sequence of test cells when the non-repetitive variation of the position of the first test pattern is exhausted in the first section of the useful fields in the sequence of the test locations;

after running through the transmission link, correlating each cell of the data stream with a reference pattern identical to, or the inverse of, the second test pattern; and evaluating the maximum of the obtained cross-correlation function with respect to its position in relation to the start of the particular cell and in relation to its height.

This specific embodiment of the process according to the present invention is particularly advantageous in that a test signal having a very large number of different test cells may be used without having to write a number into the header or into the useful field of the particular test cell to characterize the particular test cell. As a result, simultaneously recognizing bit errors is possible by evaluating the maximum of the obtained cross-correlation function.

To enable the number of test cells used in the test signal to be increased according to a numerical factor by means of the additional test pattern, another advantageous refinement of the process according to the present invention foresees varying the position of the additional test pattern, without repetition, by a same interval in each case, after exhausting, each time, the non-repetitive variation of the position of the first test pattern in the first section of the useful fields in the sequence of the test cells. Thus, if a certain number of test cells is reached by exhaustively varying, without repetition, the position of the first test pattern in the first section of the useful fields in the sequence of the test cells, then, by changing the position of the second test pattern, an equally large number of test cells can be achieved by again varying, without repetition, the position of the first test pattern in the first section of the useful fields. A further doubling of the range of available numbers of different test cells can be advantageously achieved by supplementing the test signal with other test cells, each of which are provided with a test pattern that is the inverse of the second test pattern in the second section of their useful fields.

The present invention will be clarified in the following in light of its application in a broad-band communication system (B-ISDN) based on the drawings.

DETAILED DESCRIPTION

The process according to the present invention can be applied, in particular, to the so-called asynchronous transfer mode (ATM) for the wide-band ISDN (Integrated Service Digital Network) process. The ATM method appears to be a universal solution for transmitting different services covering a broad spectrum of bit rates.

Simultaneously handling different services over one link connection, places ever greater demands on communication networks, such that developing a new transmission technology is necessary. Such a new network should have a flexible transmission rate and should be open to low transmission rates. The wide-band ISDN, with a transmission capacity of 140 MBit/s is well suited for video transmission (for example, for video conferences), or for transmitting large quantities of data, as is required in the magazine and periodical industry. The ATM transmission method can be advantageously applied in B-ISDN technology for all services known today, and its flexible bit rate makes it a viable system for future services.

In the future, the B-ISDN will be introduced to expand on the previous ISDN (Integrated Service Digital Network). Its important distinction from ISDN and SONET (Synchronous, Optical Network) is an asynchronous transmission mode.

Figure 1:
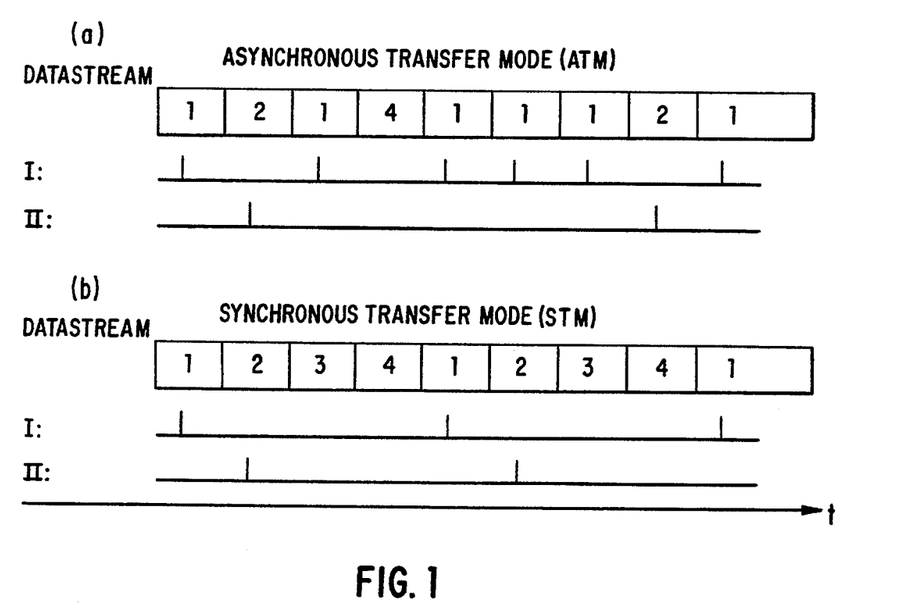
FIG. 1 illustrates the temporal occurrence of certain cells of certain data streams to clarify the differences between the asynchronous transfer mode and the synchronous transfer mode.

FIG. 1a shows an irregular occurrence of cells in the data streams 1,2,3,4 during the asynchronous transfer mode ATM of the B-ISDN, in contrast to the regular temporal occurrence during the synchronous transfer mode shown in FIG. 1b. Particularly significant is that, in contrast to the synchronous transfer mode (STM), a specific time slot is not allocated to a transmission channel. In the asynchronous transfer mode, the sequence of the cells, allocated to the particular channel 1,2,3,4, etc., is not specified.

The configuration of the cells (frequency distribution) permits virtually any bit rate at all to be used in the ATM mode to fully utilize the channel capacity. This process is therefore open to future developments in transmission rates. All data transmissions that arise (telephone, full-motion video transmission, computer networking, etc.) can be integrated into one transmission system.

Figure 2:
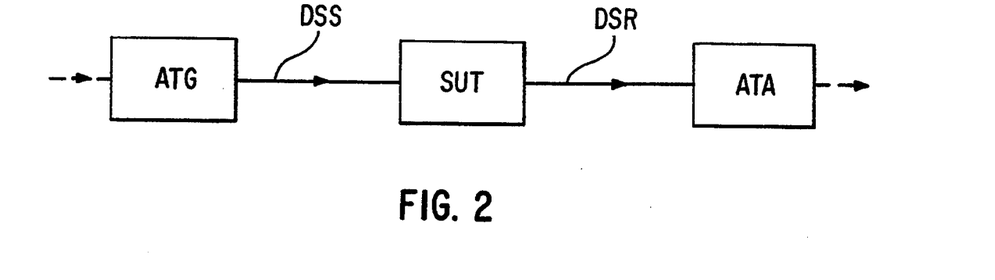
FIG. 2 is a schematic of an arrangement for implementing the process according to the present invention.

FIG. 2 shows a corresponding device for implementing the process according to the present invention. To check quality parameters, a transmission link SUT is selectively stimulated by an ATM-generator ATG with a data stream DSS serving as a test signal. A received data stream DSR is then checked by means of an ATM-analyzer ATA for possible interference effects in the transmission link SUT.

Figure 3:
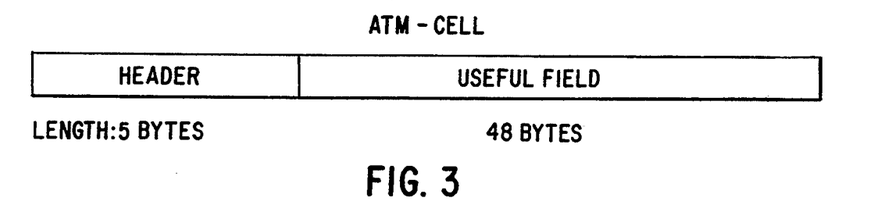
FIG. 3 illustrates a possible structure of a cell of a digital data stream.

FIG. 3 illustrates an ATM cell structure, subdivided into a useful field section and header section. The useful field section is 48 bytes (i.e., 48×8 bits) and the header section is 5 bytes. Such an ATM cell structure is known from a recommendation of the CCITT (Comité Consultatif International Télégraphique et Téléphonique).

From the test cell, important information including the test cell number and the bit-error rate in the useful field can be extracted. Furthermore, identifying a test cell as a test cell is important. In previous proposals, this information is contained in separate data fields in the useful field (test cell number, bit-error field and test cell identification).

Figures 4, 5:
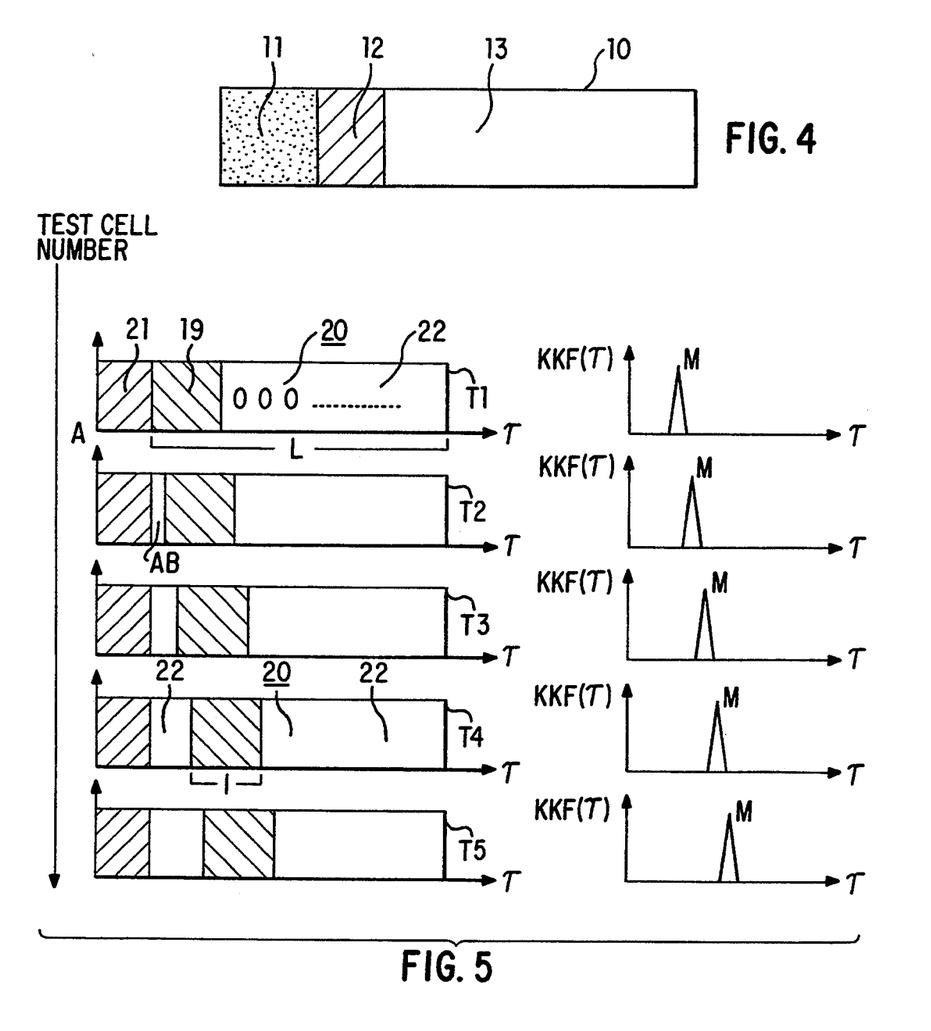
FIG. 4 illustrates a test cell structure.
FIG. 5 illustrates the shifting of a test pattern in the available useful field based on the test cell number.

As FIG. 4 shows, each test cell 10 can be subdivided into a header 11, a useful field 12 used for internal data (for example, test cell number, test cell identification, time stamp) and a useful field 13 provided for a bit-error measurement.

The space remaining for the bit-error measurement in the available useful field 13 is relatively small. One purpose of the present invention is to condense as much information as possible pertaining to the test cell in one signal, thus permitting the bit-error measurement at the same time. For this purpose, the data for bit-error measurement, test cell identification, as well as test cell number are combined according to the method of present invention.

The ATM-generator ATG (FIG. 2) produces a sequence of test cells T1,T2,T3,T4,T5, each of which includes a useful field available for the bit-error measurement and having a test pattern 19 written into it. The autocorrelation function AKF of this test pattern is ideally a Dirac pulse. This condition is adequately fulfilled, for example, by M-sequences, pseudorandom numerical sequences, and by the Barker code.

FIG. 5 depicts the header 11 condensed into one field 21 with the useful field 12 used for internal data (compare FIG. 4). The length 1 of one test pattern 19 is shorter than the length L of the available useful field 20. As a result, the position of the test pattern can be shifted from test cell to test cell (preferably in each case by a same interval AB, in particular by one bit to the right (or to the left)) until the test pattern has covered the entire available useful field 20. This shifting may then be repeated cyclically, if indicated. The area 22 of the available useful field 20, which does not have the test pattern 19 written into it, is either occupied with only the binary value "1" or only the binary value "0".

For each received cell, the ATM-analyzer ATA (FIG. 2) now formulates the cross-correlation function KKF with a generated or supplied reference pattern, which has a known phase reference at the start of the cells. A maximum M for the available useful field 20 is obtained, having a position which varies depending on the actual test cell number (i.e., depending on the position of the test pattern within the cell).

Figure 6:
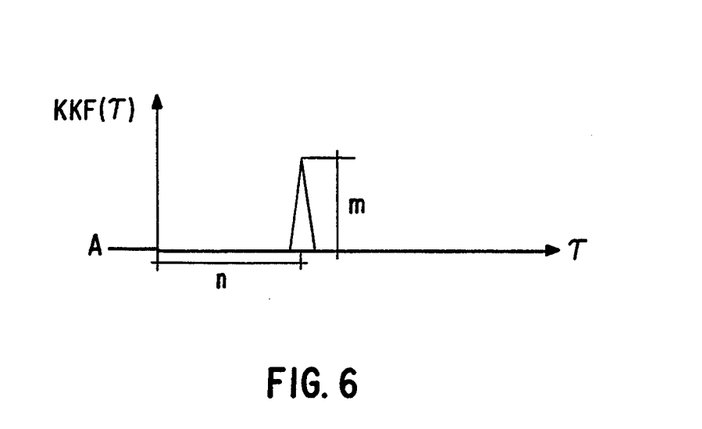
FIG. 6 schematically illustrates the evaluation of the cross-correlation function.

The cross-correlation function KKF obtained for the area of the available useful field is evaluated according to FIG. 6. The height m of the maximum of the obtained cross-correlation function KKF indicates the similarity between the received test pattern and the reference pattern. Thus, recognizing the test cell as a test cell (i.e., identifying a test cell) and providing information on the bit-error rate is possible. The position n of the maximum of the cross-correlation function KKF relative to the start A of the particular cell indicates the test-cell number.

The process according to the present invention has important advantages including:
- providing the largest possible test area for measuring the bit-error rates in the available useful field;
- the ability to determine the bit-error rate by the height m of the maximum M;
- the ability to recognize the test pattern without requiring synchronization with the transmitted test pattern;
- the ability to recognize the test cell through the cross-correlation function KKF of the test pattern (no additional data necessary);
- the ability to determine the test cell number by the position n of the maximum of the cross-correlation function KKF without needing separate data; and
- the ability to recognize systematic bit errors based on the variable position of the test pattern.

Figure 7:
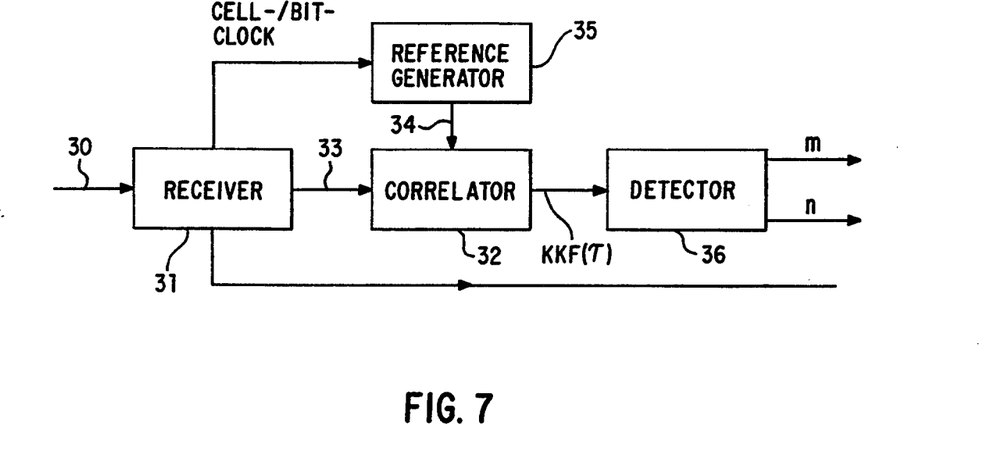
FIG. 7 is a block diagram of the structure of the ATM analyzer shown in FIG 2.

The signal flow for the ATM-analyzer ATA is explained below referring to FIG. 7. A received cell 30 is fed by a receiver 31 to a correlator 32. The correlator 32 correlates the available useful field 33, in which the test pattern is found, with a cell- and bit-synchronous reference pattern 34 (or with the binary-inverted reference pattern). A reference generator 35 generates the reference pattern 34.

The digital signals of the cell 30, which are in general, unipolar, as well as of the digital reference generator 35 are converted, by adding an offset quantity, into bipolar signals, since as a rule, the known test patterns, having a single pulse autocorrelation function AKF are bipolar signals. If this is not considered, the unambiguous nature of the amplitude of the cross-correlation function KKF is lost for the consideration of similarity.

From the thus obtained cross-correlation function KKF, a detector 36 determines the height m and position n of the maximum M. As explained above, from this, the test cell number, the test cell identification, as well as the bit-error rate can be determined.

Figure 8:
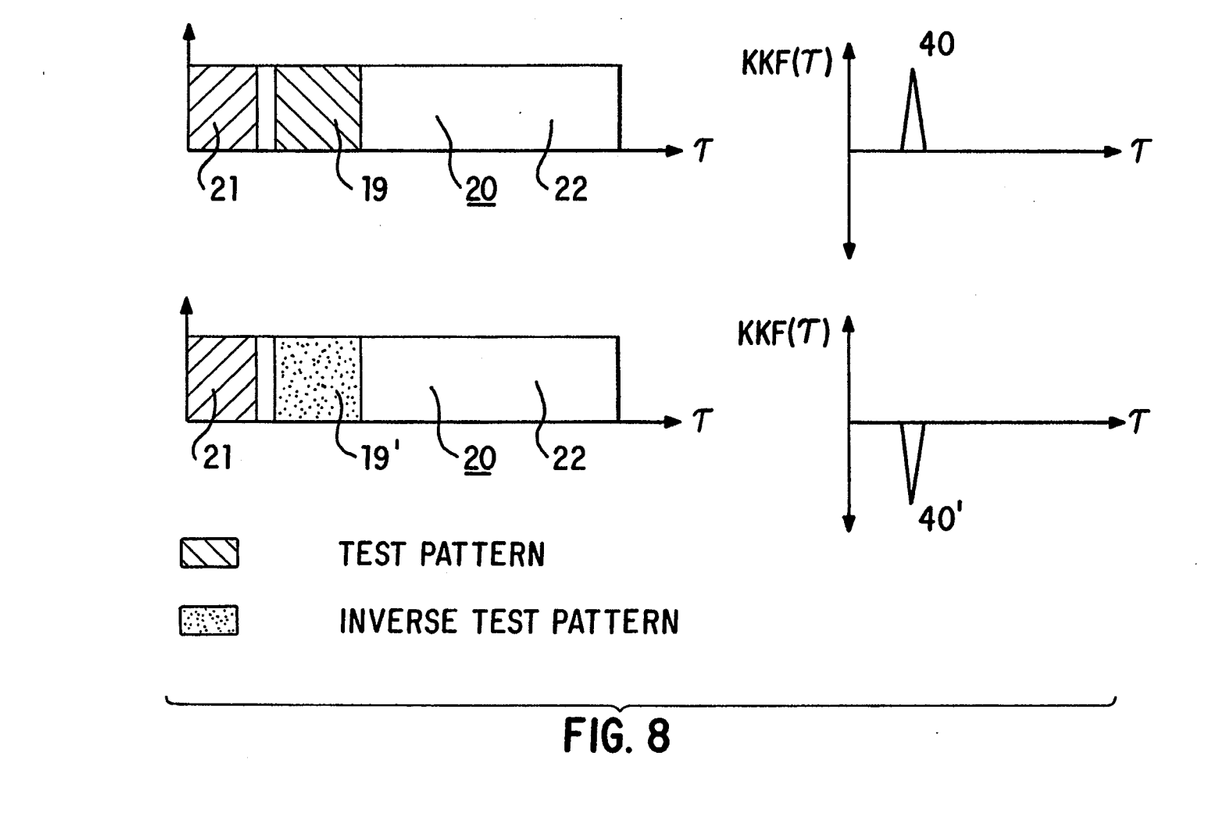
FIG. 8 illustrates the conditions when other test cells are used, whose useful fields are partially occupied in each case with an inverse test pattern.

The range of available test cell numbers can be doubled when the ATM-generator ATG transmits the test pattern 19 once and the inverse test pattern 19' once (that is the binary values "1" or "0" of the test pattern 19 are converted into the binary values "0" or "1" of the inverse test pattern 19'). The cross-correlation function KKF then ideally shows a positive maximum 40 or a negative 40' maximum, depending on whether the transmitted test pattern is inverted or not, as is shown in FIG. 8.

Figure 9:
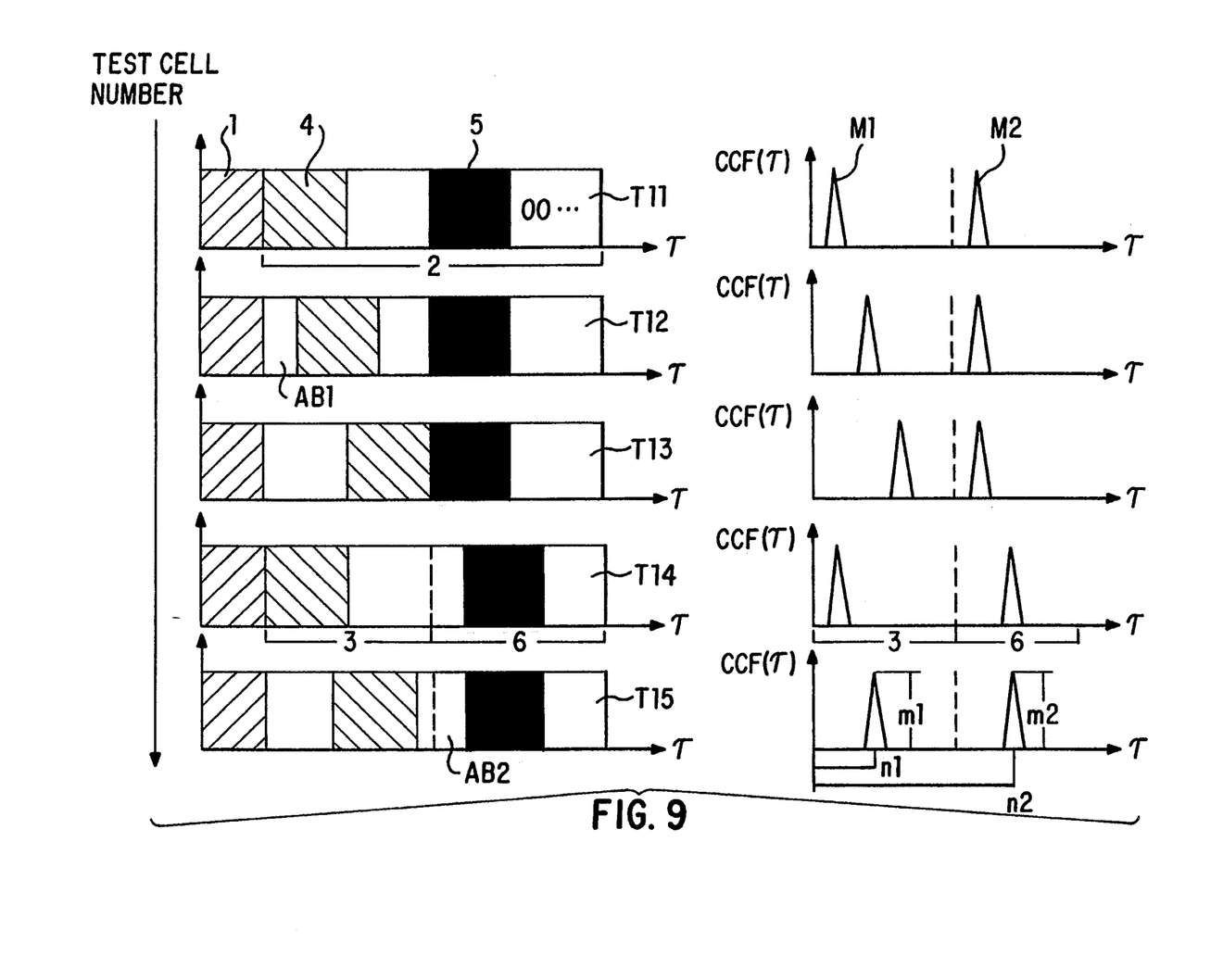
FIG. 9 illustrates various test cells of one measuring signal with variably shifted test patterns as well as second, variably shifted, test patterns.

In another specific embodiment of the process according to the present invention, the ATM-generator ATG of FIG. 2 generates a sequence of test cells T11, T12, T13, T14 and T15 as a test signal, as shown in FIG. 9. Each test cell includes one header 1 and one useful field 2. The header is 5 bytes, while the useful field is 48 bytes, for example. A first test pattern 4 is written into each of the test cells T11 through T15 in a first section 3 of their useful field 2. The autocorrelation function of the test pattern 4 is ideally a Dirac pulse. Test patterns with such properties include M-sequences, pseudorandom numerical sequences or, for example, the Barker code.

As shown in FIG. 9, each test pattern 4 is shorter than the first section 3 of the useful field of the particular test cells. In this manner, the position of the one test pattern 4 can be displaced from test cell to test cell, preferably in each case by a same interval AB1, in particular by one bit to the right (or to the left), until the one test pattern 4 has covered the entire available section 3 of the useful field 2. Until this point, this specific embodiment of the process according to the invention conforms with that of FIGS. 5–7.

Departing from the process described earlier on, each test cell is supplemented here by a second test pattern 5, which is written into a second section 6 of the useful field 2. This additional test pattern 5 retains a fixed position in the test cells T11 through T13. The area of the useful field 2 which does not have a test pattern 4 and 5 written into it, is occupied either with the binary value "1" or with the binary value "0".

For each received cell T11 through T13 and separately for sections 3 and 6 of the useful field 2, the ATM analyzer of FIG. 2 now formulates in each case the cross-correlation function with a generated or supplied reference pattern, which has a known reference to the start of the cells. As the right part of FIG. 9 shows, for each section 3 or 6 of the useful field 2, a maximum value M1, or M2 respectively, is obtained. The position of M1 and M2 varies depending on the actual test cell number (i.e., depending on the positions of the first and second test patterns). By jointly considering the positions (n1 and n2) of the two maxima in sections 3 and 6 of each useful field 2, the test cell number is clearly indicated.

In accordance with the example depicted in FIG. 9, it is no longer possible after test cell T13 to vary, without repetition, the position of the first test pattern 4 in the one section 3 of the useful field 2. Therefore, to identify the actual cell number of the further test cells T14 and T15, the position of the second test pattern 5 in the second section 6 of the useful field 2 is shifted by one interval AB2, preferably by one bit. At the same time, the test pattern 4 in the first section 3 of the useful field 2 is brought into its original position. By varying the position of the first test pattern 4 in the first section 3 of the useful field 2, while retaining the position of the second test pattern 5, an additional number of test cells can be identified in the measuring signal. The maxima resulting from cross-correlation are represented in turn in the right part of FIG. 9.

Figure 10:
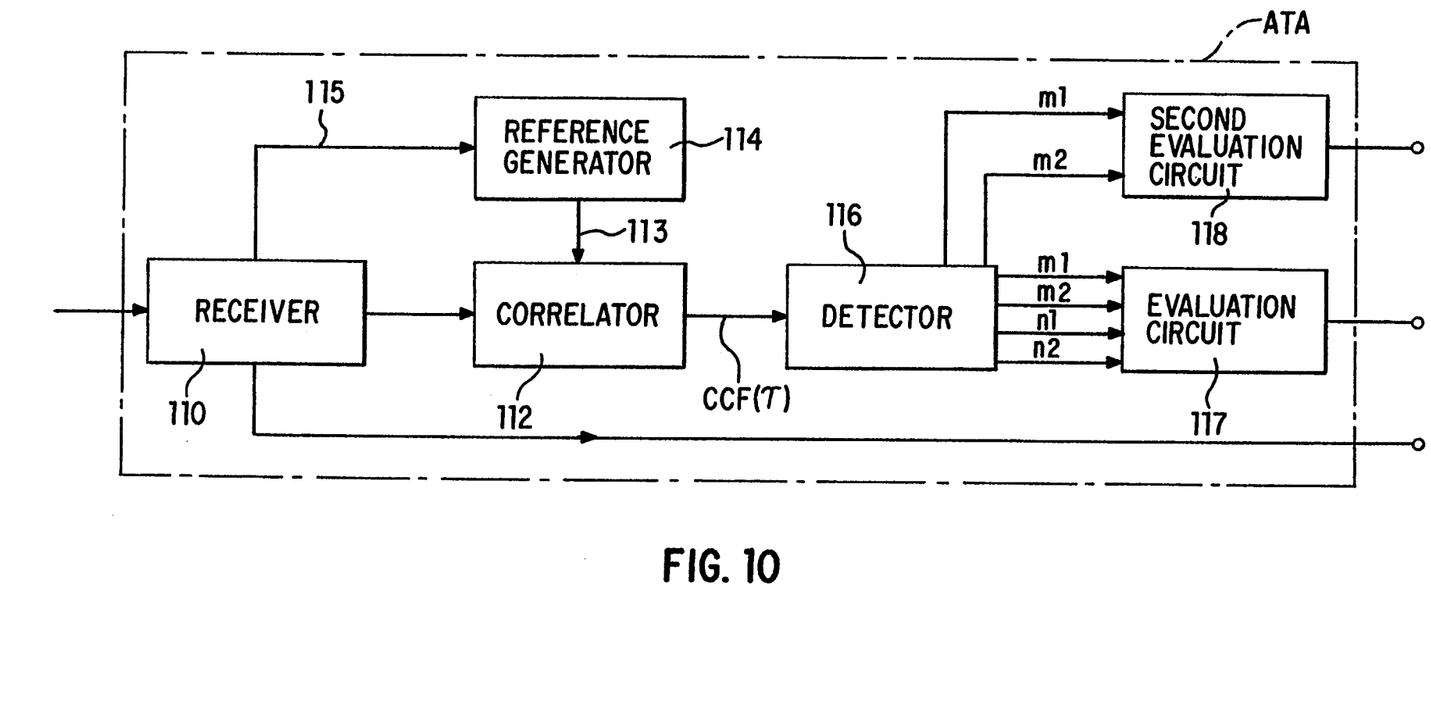
FIG. 10 is a block diagram of an exemplified embodiment of an analyzer provided.

The cross-correlation realized with the extraction of maxima M1 and M2 is performed in an ATM-analyzer ATA, which can be designed as shown in FIG. 10. On the input side, the analyzer ATA includes a receiver 110. The test signal is fed in the form of test cells T11 . . . T15 to the receiver 110 via the transmission link SUT to be analyzed. Arranged downstream from the receiver 110, is a correlator 112 which correlates the useful field of each received test cell of the test signal with a cell- and bit-synchronous reference pattern 113 produced by a reference generator 114. The synchronization ensues from the receiver 110 via a link connection 115.

A signal CCF(T), which corresponds to the cross-correlation function, is supplied by the correlator 112 to a downstream detector 116. From the signal supplied to it, the detector 116 determines the height m1 and position n1 of the maximum M1 corresponding to the first test pattern 4 in first section 3 of the useful field 2 of the particular test cell, and the height m2 and position n2 of the maximum M2 corresponding to the second test pattern 5 in the second section 6 of the useful field 2 of the test cell received at any one time. From this, the test cell number of the test cell of the test signal received at any one time is determined in a downstream evaluation circuit 117. Connected to the detector 116 is, moreover, a second evaluation circuit 118, which calculates the bit error from the heights m1 and m2 of the maxima M1 and M2.

The range of available test cell numbers can be doubled again when the ATM-generator ATG transmits once the additional test pattern 5 and once the test pattern that is the inverse of the test pattern 5. Ideally, the cross-correlation function then shows a positive or a negative maximum depending on whether the transmitted, additional test pattern 5 is inverted or not.

What is claimed is:

1. A process for determining quality parameters of a transmission link for digital data streams, the digital data streams having a cellular structure, each cell having a useful field able to be freely occupied with data, comprising steps of:
    a) providing a sequence of test cells as a test signal, each of said test cells including a useful field, each of said useful fields being partially occupied with a test pattern consisting of a number of binary-coded data,
wherein an auto-correlation function of said test patterns approximates a Dirac pulse;
    b) positioning the test pattern within the useful field of each test cell within the sequence of test cells such that the position of the test pattern within the useful field is not repeated within the sequence of test cells;
    c) transmitting each cell through the transmission link;
    d) after transmitting each cell through the transmission link, correlating each cell of the data stream with a reference pattern selected from a group consisting of a pattern which is identical to the test pattern and a pattern which is the inverse of the test pattern, thereby obtaining a cross-correlation function; and
    e) evaluating a global maximum of the cross-correlation function with respect to its position in relation to the start of a respective test cell and with respect to its height, thereby obtaining a measure of quality of the transmission link.

2. The process according to claim 1 wherein, in each of the test cells, all areas of said useful field not occupied with said test pattern, are occupied with identical binary values.

3. The process according to claim 1 wherein the positioning of the test pattern within the useful field, in each of the sequence of test cells, of step (b) is by a same interval.

4. The process according to claim 2 wherein the positioning of the test pattern within the useful field, in each of the sequence of test cells, of step (b) is by a same interval.

5. The process according to claim 1 wherein said test signal is supplemented by other test cells each including useful fields which are partially occupied with an additional test pattern, said additional test pattern being the inverse of the test pattern.

6. The process according to claim 2 wherein said test signal is supplemented by other test cells each including useful fields which are partially occupied with an additional test pattern, said additional test pattern being the inverse of the test pattern.

7. The process according to claim 3 wherein said test signal is supplemented by other test cells each including useful fields which are partially occupied with an additional test pattern, said additional test pattern being the inverse of the test pattern.

8. The process according to claim 4 wherein said test signal is supplemented by other test cells each including useful fields which are partially occupied with an additional test pattern, said additional test pattern being the inverse of the test pattern.

9. The process according to claim 1 wherein
   each of the test cells are occupied, in addition to the test pattern provided in a first section of their useful fields, in a second section of their useful fields with a second test pattern, said second test pattern including a number of binary-coded data, whereby the auto-correlation function of the second test pattern approximates a Dirac pulse;
   the position of the second test pattern in the second section of the useful fields of the test cells is shifted within the sequence of test cells when the test pattern in the first section of the useful fields in the sequence of the test cells can no longer be positioned without repetition;
   after transmitting the test cells through the transmission link, each test cell of the data stream is correlated with a reference pattern selected from a group consisting of a pattern which is identical to the second test pattern and a pattern which is the inverse of the second test pattern; and
   the maximum of the obtained cross-correlation function is evaluated with respect to its position in relation to the start of a respective test cell and in relation to its height.

10. The process according to claim 9 wherein the position of the second test pattern is shifted, without repetition, by a same interval, in each case, each time the test pattern in the first section of the useful fields in the sequence of the test cells can no longer be positioned without repetition. cm 11. The process according to claim 9 wherein said test signal further includes test cells being occupied in the second section of their useful fields with a test pattern that is the inverse of the second test pattern.

11. The process according to claim 9 wherein said text signal further includes test cells being occupied in the second section of their useful fields with a test pattern that is the inverse of the second test pattern.

* * * * *